W. H. BROWN.
LEAF SPRING LUBRICATOR.
APPLICATION FILED DEC. 27, 1915.
1,219,804.
Patented Mar. 20, 1917.
2 SHEETS—SHEET 1.
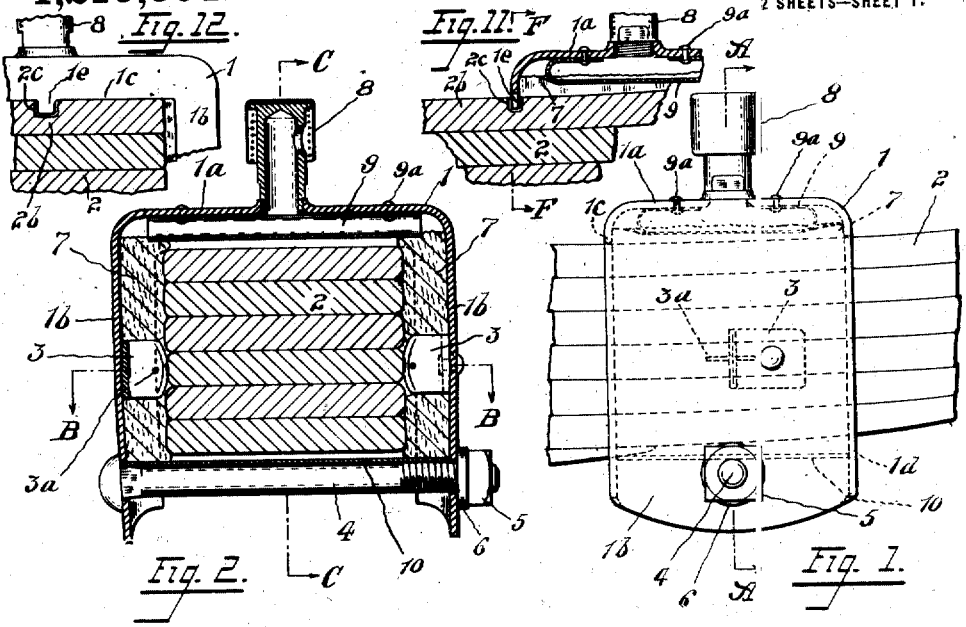
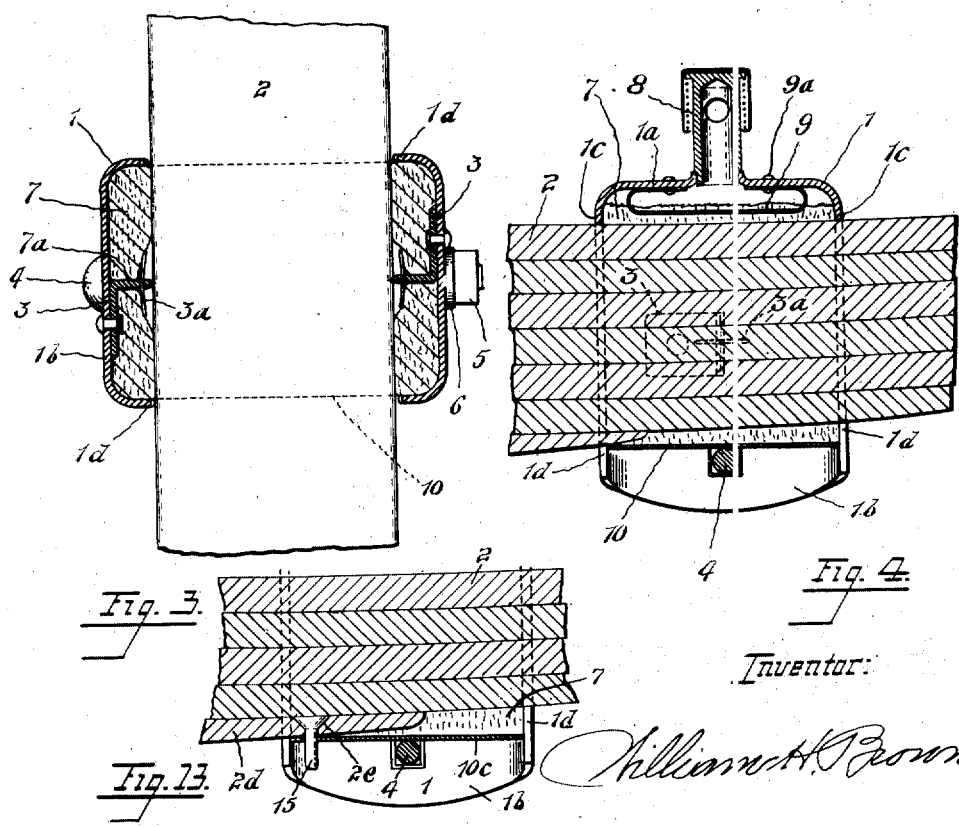
Inventor:
William H. Brown W. H. BROWN.
LEAF SPRING LUBRICATOR.
APPLICATION FILED DEC. 27, 1915.
1,219,804.
Patented Mar. 20, 1917.
2 SHEETS—SHEET 2.
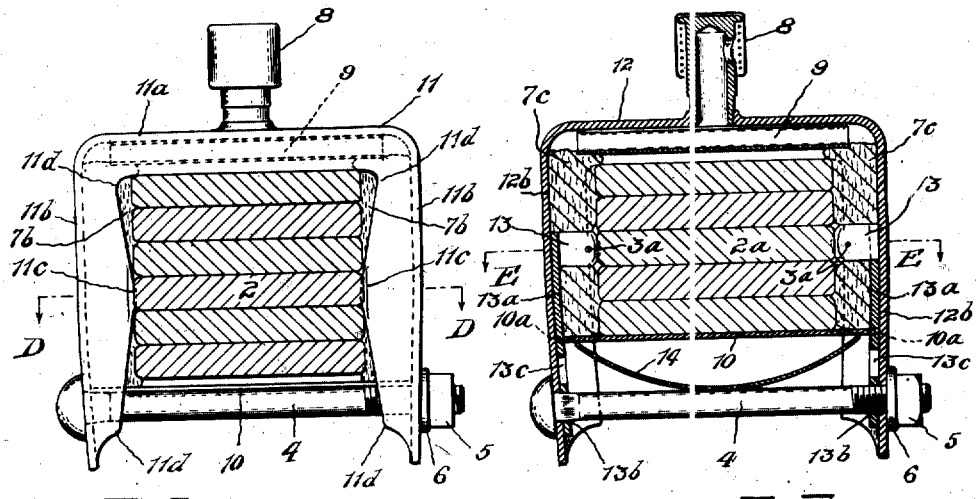
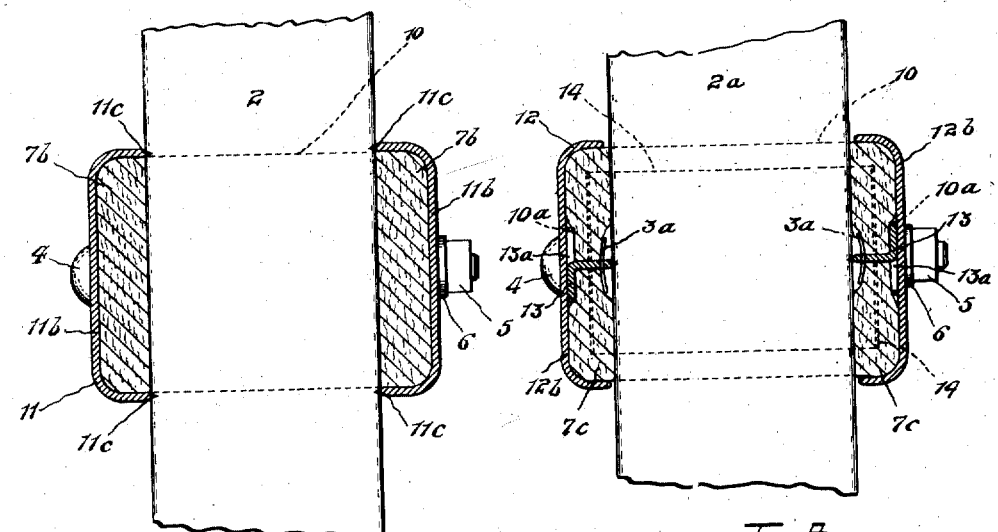
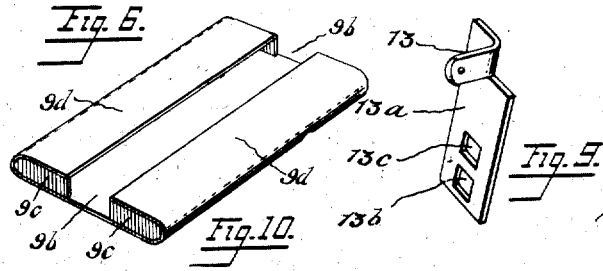
Inventor:
William H. Brown

UNITED STATES PATENT OFFICE.

WILLIAM H. BROWN, OF CLEVELAND, OHIO.

LEAF-SPRING LUBRICATOR.

1,219,804. Specification of Letters Patent. Patented Mar. 20, 1917.

Application filed December 27, 1915. Serial No. 68,767.

*To all whom it may concern:*

Be it known that I, WILLIAM H. BROWN, a citizen of the United States, residing at Cleveland, in the county of Cuyahoga and State of Ohio, have invented certain new and useful Improvements in Leaf-Spring Lubricators, of which the following is a specification.

My invention relates to devices for supplying lubricant to the joint surfaces of leaf springs, and is particularly applicable to the leaf springs of road vehicles such as automobiles, which springs, due to their exposure to dirt and water, rapidly lose the lubricant which may have been applied to their surfaces when the springs were assembled, and develop unpleasant squeaks which are not only annoying, but are significant of the rapid wear of the spring surfaces. The object of my invention is to provide a device for lubricating leaf springs which can be readily applied to the assembled spring and which will not work loose or become displaced by the relative movement of the spring leaves upon each other.

Another object of my invention is to provide a lubricant-receiving and holding reservoir communicating with an absorbent or lubricant holding pad which contacts with the edges of the surfaces of the spring leaves, so that when supplying the pad with oil, it will be unnecessary to wait for the pad to absorb the oil, but the oil may be quickly put into the reservoir and left to be slowly absorbed by the pad without consuming the attendant's time.

Another object of my invention is to provide a leaf spring oiler which shall be held in place by the engagement of some of its parts with a single leaf of the spring.

The foregoing and other objects are attained by the use of my invention as described herein and shown in the accompanying drawings, in which:

Figure 1 is a side view of a leaf spring lubricator embodying my invention.

Fig. 2 is a section on line A A of Fig. 1.

Fig. 3 is a section on line B B of Fig. 2.

Fig. 4 is a section on line C C of Fig. 2.

Fig. 5 is an end view of a modified form of my invention.

Fig. 6 is a section on line D D of Fig. 5.

Fig. 7 is a vertical transverse section of another modification of my invention.

Fig. 8 is a section on line E E of Fig. 7.

Fig. 9 is a perspective view of the retaining lug used in the modification shown in Figs. 7 and 8.

Fig. 10 is a perspective view of a preferred form of oil reservoir.

Fig. 11 is a fragmentary longitudinal section through a modified form of anchoring device.

Fig. 12 is a section on line F F of Fig. 11.

Fig. 13 is a fragmentary longitudinal section through another form of anchoring device.

Referring to the drawings, 1 is a clip comprising the horizontal center portion $1^a$, and two downwardly extending side limbs, $1^b$, $1^b$.

The clip, 1, as shown, is a U shaped sheet metal stamping of shallow, channel cross section, but it will be understood that the clip may be made of other material suited to the purpose. The clip, 1, is adapted to slip loosely over the assembled leaf spring such as shown in the drawings at 2, the inturned flanges, $1^c$, of the horizontal portion, $1^a$, resting upon the top leaf of the spring, 2.

Each of the side limbs, $1^b$, has riveted or otherwise secured to it, an inwardly projecting, anchoring lug, 3, which is adapted to contact with one of the leaves of the spring for the purpose of preventing the device from slipping along the spring, when the clip is clamped in place. In the drawings, lug, 3, is shown as a short piece of thin, angle steel riveted to the side limb, the projecting flange of the angle having its end cut oval and its edge sharpened. This steel finger or lug may be hardened, if desired, in order that its sharp edge may more firmly grip the side of the spring leaf against which it presses. 4 is a bolt which passes through the side limbs, $1^b$, below the spring, 2, and is adapted to coöperate with the nut, 5, and washer, 6, to draw the side limbs, $1^b$, toward each other. The inwardly projecting edges of the lugs, 3, which lie in planes transverse to the spring leaves, project a short distance farther from the walls of the side limbs, $1^b$, than do the inturned flanges, $1^d$, so that when the side limbs are drawn toward the sides of the spring, 2, by bolt, 4, the edges of the lugs, 3, will strike the sides of the spring before the flanges, $1^d$, strike them.

I prefer to locate each lug, 3, so that it will contact with only one leaf of the spring, as shown in the drawings, and, where two lugs are used on opposite sides of the spring, as in the drawings, I prefer that both be arranged to contact with the same leaf of the spring. However, by making the lug oval-ended, as shown, even when the lug stands opposite a joint between the spring leaves, it will not contact with more than two leaves and those leaves will be contiguous to each other. As there is very slight relative movement between contiguous leaves and as the lug will generally bear harder upon one of these than upon the other, the device will not be displaced by this movement, but will virtually be anchored to only one of the leaves and thus leave all the leaves free for independent movement when in action.

In one or both of the compartments formed between the side limbs, $1^b$, and the sides of the spring, 2, I place a pad of felt or other lubricant absorbing material, 7, so as to cover all of the joints between the spring leaves within the casing. A slit, $7^a$, in this pad permits the lug or ear, 3, to extend through the pad and contact with the spring, 2. Pins, $3^a$, may be inserted in suitable holes in lugs, 3, to retain the pads in place when the device is not assembled upon a spring.

A dust capped oiler, 8, is provided in the horizontal center portion, $1^a$, of the clip, 1, this oiler discharging into the compartment or space formed between this portion, $1^a$, and the top of spring, 2. In this space, is placed a trough or reservoir, 9, which extends across the top of spring, 2, within the casing, 1, and is arranged to receive the lubricant which is inserted through the oiler, 8, and deliver it to the pads, 7. The ends of this trough or reservoir are open, and the pads, 7, which extend up to these open ends, absorb the lubricant as rapidly as it is transmitted through the pads.

The troughs, 9, may be riveted, welded or otherwise secured to the clip, 1, or they may be simply inserted without being attached to the clip. In Figs. 1, 2, and 4, they are shown riveted at $9^a$. It is to be noted that best results are obtained when the openings at the ends of the trough are small and are arranged to deliver oil near the middle of the top of the pad. In Fig. 10, I have shown a trough or reservoir having such small central openings, $9^b$, formed by partially closing the ends, $9^c$, of the troughs, $9^d$.

I prefer to make the pads, 7, of such an initial thickness that they must be considerably compressed in the application of the device to a spring, in order that the pads may press firmly against the edges of the spring leaves, and in order that the lubricant will not be too rapidly withdrawn from the reservoir, 9.

In order to limit the drawing together of the side limbs, $1^b$, by the bolt, 4, and to form a closure for the bottoms of the side compartments which contain the pads, 7, I provide a plate, 10, which extends across the bottom of the spring, 2, and has its ends shaped to conform to the inner surfaces of the limbs, $1^b$. The length of the plate, 10, should be made such that the side limbs, $1^b$, will not be drawn against it until after the anchoring lugs, 3, are in contact with the sides of the spring, 2, and the ends of the side limbs, $1^b$, below the lugs, 3, are bent slightly inward. The plate, 10, when thus used will form an abutment to limit the clamping effect of the bolt, 4, upon the side limbs, $1^b$, and will also form the closure for the side compartments above described. It is evident that the material of which the clip, 1, is made should be somewhat elastic, so that the side limbs, $1^b$, will not become "set" when thus clamped on a spring. The springing of the clip is so slight, that I have found that any of the ordinary cast or stamped metals, such as steel, iron or brass are suitable materials for it.

In Figs. 5 and 6, I have shown a modification of my invention in which the lugs, 3, are not used, but instead of this means for preventing longitudinal slipping of the oiling device upon the spring, the inwardly turned flanges of the side limbs, $11^b$, of the clip, 11, are broader near their centers, $11^c$, than at their ends, $11^d$, so that when the side limbs are drawn together, the inwardly turned flanges of the side limbs, $11^b$, engage with a leaf of the spring at $11^c$. The edges of the inwardly turned flanges are shown sharpened at $11^e$, and may be hardened in order to firmly engage a leaf of the spring, 2.

In this modification of my invention, the felt pads, $7^b$, are similar in every way to the pad, 7, excepting that they do not have to be slit to accommodate the lugs, 3. The plate, 10, is shown in this modification used in the same manner as in Figs. 1 to 4 inclusive.

In Figs. 7 and 8, there is shown still another modification of my invention differing from the forms previously described. In the form shown in Figs. 7 and 8, I have shown an anchoring lug, 13, which, instead of being riveted to the side limbs, $12^b$, of the clip, 12, is secured in position by having a downwardly extending portion, $13^a$, through suitable holes, $13^b$, in which, the bolt, 4, passes.

This modification of my invention is shown in Fig. 7 applied to a spring composed of only five spring leaves and illustrates the manner in which my invention may be adapted for use upon springs of varying vertical thicknesses.

It will be seen that the side limbs, $12^b$, of the clip, 12, are longer than necessary to accommodate the five spring leaves of the spring, $2^a$. In the use of this modification, I employ the plate, 10, which in this instance, is notched at $10^a$, to give room for the downwardly extending portions, 13ª, of the lug, 13, and also to hold said lugs in vertical position. I also employ a bent flat spring member, 14, which is adapted to rest upon the bolt, 4, and hold the plate, 10, in position against the spring, 2ª, and the pads, 7ᶜ. When it is desired to use this modification of my invention upon a thicker spring, the flat spring member, 14, may be dispensed with, and the bolt, 4, may be passed through the holes, 13ᶜ, of the lugs, 13, if found desirable. Various modifications of the lugs, 13, and the other elements of this form of my invention may be made as will be apparent to those skilled in the art.

In Fig. 9, the retaining lug, 13, is shown struck up from a piece of flat steel, 13ª, in a manner which needs no further description.

In Fig. 10 is shown a form of oil reservoir, 9ᵈ, in which the outlet for the passage of oil to the pad is at the center, 9ᵇ, the ends of the reservoir being closed as shown at 9ᶜ except for the outlets, 9ᵇ. The purpose of this is to check the flow of oil to the pad and deliver it to the central portion of the pad so that it may have an opportunity to absorb all the oil.

In Figs. 11 and 12, is shown an anchoring means consisting of a tang or projection, 1ᵉ, to the flange, 1ᶜ, of clip, 1, which enters a hole, 2ᶜ, in the leaf, 2ᵇ, of the spring, 2.

In Fig. 13, another form of anchoring device is shown, consisting of a pin, 15, which is secured in a hole, 2ᵉ, in leaf, 2ᵈ, of spring, 2, and passes through a hole in the plate, 10ᶜ. In this construction, the leaf, 2ᵈ, should preferably be provided with the hole, 2ᵉ, and the pin, 15, should be inserted in it before the spring leaves are assembled.

I am aware that other forms of leaf spring oiling devices have been previously proposed, but none of them with which I am familiar embody the advantages of my present improvements. It will be seen that, while in my present invention I do not attempt to provide a casing for confining a body of lubricant against the edges of the spring leaves, I have provided a capillary pad in contact with all the leaves of the spring within the casing, and a reservoir for receiving lubricant and delivering it to the pad. It will be seen further that while my improved clip is not oil tight, it is so designed as to be practically water and dirt proof.

In all leaf springs there is relative movement of the leaves when the spring is being flexed. For this reason it is practically impossible to make a lubricant tight joint between the edges of the spring leaves and an adjacent casing, or to hold such a casing against displacement by clamping it against the edges of all the spring leaves. With these facts in mind the advantages of the improvements herein disclosed will be apparent, when comparison is made between my present invention and other leaf spring lubricating devices.

In other forms of leaf spring lubricating devices with which I am familiar, certain provisions which are essential to practical, satisfactory service are lacking. For instance, in some of these other forms, there is provided a compartment for confining lubricant against the edges of the spring leaves, within the compartment. In such devices the level of the lubricant in the compartment must be maintained as high as the uppermost joint between the spring leaves in order to lubricate that joint. If oil be used in such a device, it soon escapes through the joints between the leaves of the spring, and each joint receives no further lubrication after the level of the oil in the lubricant holding compartment has fallen below that joint. If grease be used in such a device, it, also, fails to lubricate all of the spring joints unless a compression grease cup be used to continually keep the lubricant holding compartment full of grease and in contact with the edges of the spring leaves by feeding pressure applied to the grease. Such devices, therefore, demand constant attention and are wasteful of lubricant. In the use of my improved leaf spring lubricator, a small quantity of oil is inserted into the reservoir, and this oil is gradually absorbed by the capillary pad which becomes uniformly saturated. From it, the oil is drawn by capillary attraction into the joints between the spring leaves as long as there is any oil left in the pad. The capillary pad, however, by its own capillary action, prevents the oil from flooding the joints and automatically, conserves and economizes the oil which may be placed in the reservoir. On account of the use of a capillary pad, it is unnecessary to make an oil tight compartment against the side of the spring, such as must be used when no pad is provided, and which compartment I have found it practically impossible to maintain oil tight, due to the relative movement of the spring leaves. It will be observed that my invention can readily be applied to springs which vary considerably in their dimensions and whose leaves may not be accurately alined with each other. In other words, my device adapts itself to the manufacturing variations or tolerances of practical spring fabrication.

It will be observed that in the forms of device illustrated in Figs. 1 to 7, inclusive, the oil is dammed up in the trough 9 in the same manner as in the modification illustrated in Fig. 10. In these figures, the upper ends of the pads abut against the lower lips of the trough and thus partially choke or stop up the ends of the trough, whereby the pads together with the adjacent parts of the clip will tend to partially choke the outer ends of the trough, thereby enabling the attendant to quickly deposit the oil in the trough and let it soak into the pads gradually. In this way, the attendant will not need to await the absorption of the oil by the pads.

I claim:

1. In a spring oiler of the type set forth, a pair of channels and means for holding these channels at the sides of the spring, said means embodying a top member extending across the spring and connecting the channels, a distributing trough arranged under said top member and extending across the spring, and means for constricting the outlet ends of the distributing trough and for delivering the oil to the edge of the spring.

2. In an oiler of the type set forth, a pair of channels and means for holding these channels at the sides of the spring, an open-ended distributing channel extending across the top of the spring, and a pad in each of said channels bearing against the edges of the spring and having its upper end engaging the lower lip of said distributing trough, for the purpose set forth.

3. The combination with a spring comprising a plurality of superimposed leaves, of a clip comprising a horizontally disposed central portion having two vertically disposed downwardly extending limbs, said clip being adapted to encompass a portion of said spring about the top and two sides thereof, said clip being of channel cross section the flanges of the channel being directed toward the spring, thus forming connecting compartments at the top and sides of the spring, oil carrying material in contact with the edges of the leaves of the spring in the side compartments, and means carried by said downwardly extending limbs, engaging with only one of the leaves of said spring to prevent the longitudinal displacement of said clip on said spring.

4. The combination with a spring composed of a plurality of superimposed leaves, of an oiling device for applying a lubricant to the edges of the leaves, and means whereby the oiling device is anchored to one only of the leaves of the spring, so as to thereby permit a free and independent movement of all the leaves.

5. The combination with a spring composed of a plurality of superimposed leaves, of an oiling device for applying a lubricant to the edges of the leaves, and means whereby the oiling device is anchored to one only of the leaves of the spring, so as to thereby permit a free and independent movement of all the leaves, said anchoring means consisting of an inwardly-extending lug member biting into the leaf to which it is to be anchored.

6. The combination with a plurality of superimposed spring leaves, of means for lubricating the contacting surfaces of the leaves consisting of a casing, an oil-carrying pad therein, means for clamping the casing to the side of the spring, and a rigid anchoring device adapted to engage one only of the leaves of the spring when the clamping device is tightened and thus anchor the casing against longitudinal movement on the spring and at the same time leave all the leaves free for independent movement.

7. In an oiler of the type set forth, a pad-holding channel and means engaging opposite sides of the spring for clamping it thereto, said means embodying an ear or lug carried by the channel and extending inwardly through the pad and engaged with one leaf only of the spring.

8. In a leaf spring oiling device, anchoring means therefor engaging a single leaf of the spring upon opposite edges thereof.

9. A lubricator for a multi-ply leaf spring comprising a reservoir having a transverse delivery area adapted to overlap the interstices between the plies of said spring and a clamp disposed for engagement with one ply only.

10. A lubricator for a multi-ply leaf spring comprising a reservoir having a transverse delivery area adapted to overlap the interstices between the plies of said spring and a clamp disposed for engagement with one ply only whereby said leaves are left free to move relatively to each other.

11. A lubricator for a multi-ply leaf spring comprising a support, a permeable pad on said support and disposed to overlap the interstices between the plies of said spring, and a reservoir having a delivery to said pad, and a clamp disposed for engagement with one ply only.

12. A lubricator for a multi-ply leaf spring comprising a reservoir having a transverse delivery area adapted to overlap the interstices between the plies of said spring and a support having engagement with one ply only whereby said plies are left free to move relatively to each other.

13. A device for use with a multi-ply leaf spring, comprising a member having such engagement with said plies as to permit free movement thereof relative to each other, and means influenced by the movement of said plies for distributing a lubricant between the interstices of said plies.

14. A device for use with a multi-ply leaf spring, comprising a reservoir for a lubricant having a delivery to the spring, a transfer element effectively disposed relative to said delivery and in lubricant distributing relation to the interstices between said plies, and a clamp permitting free movement of the plies relative to each other to compress said pad and effect a distribution of the lubricant content thereof.

15. A device for use with a multi-ply leaf spring comprising a support having engagement with one ply only and permitting free relative movement of said plies, and a reservoir for a lubricant having a delivery area to all of said plies.

16. A device for use with a multi-ply leaf spring comprising a support having an engagement with said spring permitting free relative movement of the plies thereof, a reservoir for a lubricant having a delivery and a transfer element effectively disposed relative to said delivery and in surface contact with said plies.

17. The combination with a spring having a plurality of leaves, of a casing fitting over the top of the spring and extending below the spring on both sides thereof, means for confining a lubricating pad against a portion of the edges of the leaves on both sides of the spring, a common feeding means for both sides of the casing at the top thereof, and a fastening device for connecting the depending sides of the casing below the spring.

18. The combination with a spring comprising a plurality of leaves, of a casing fitting over the spring and extending below the edges thereof, means within the casing for confining a lubricating pad against a portion of the edges of the leaves at both sides of the spring, and an oil guide in the casing at the top of the spring for feeding the lubricant from the top of the spring to the edges thereof.

19. The combination with a spring having a plurality of leaves, means forming a space for containing a lubricating pad in contact with a portion of the edges of the leaves on both sides thereof, and a common lubricant feeding means consisting of an oil guide at the top of the spring with openings communicating with said spaces.

20. In an oiler of the type set forth, a pair of pad-holding channels and means for clamping them to one of the leaves of the spring, said means embodying a pair of inwardly-extending ears or lugs carried by the opposite channels extending inwardly through the pads and engaged with one leaf only of the spring.

21. An oiler of the type set forth, consisting of a pair of pad-holding chambers and means for holding them against the opposite sides of the spring, said means embodying a bottom member extending across under the spring and a top member extending across the top of the spring, one of these members being connected permanently with the pad-holding chambers and the other being detachably connected to the opposite ends thereof.

22. A lubricating clip for vehicle springs comprising a U shaped member adapted to embrace a spring one of the branches of said member having an inwardly opening chamber, a lubricant absorbing and distributing device in said chamber, and a member connecting the free ends of the U shaped member.

23. A lubricating clip for vehicle springs comprising a U shaped member adapted to embrace a spring, one of the branches whereof constitutes an inwardly opening chamber, a lubricant distributing device in said chamber, means for securing the clip to a spring, and further means for introducing a lubricant into the clip and to the distributing device.

24. A lubricating clip for vehicle springs comprising a U shaped member adapted to embrace a spring, the opposed branches whereof constitute inwardly opening channels, an absorbent lubricant distributing device in each of said channels, means for introducing a lubricant into the clip and for supplying it to said distributing devices, and a member connecting the free ends of the U shaped member.

25. A lubricating clip for vehicle springs comprising a pair of branches adapted to extend along opposite sides of a spring, one of said branches being provided with a recess for the reception of a lubricant, a member connecting the free ends of said branches, and means coöperating with said member for supplying a lubricant to the recess.

26. A lubricating clip for vehicle springs comprising a pair of branches adapted to extend along opposite sides of a spring, each of said branches being provided with a recess for the reception of a lubricant, means connecting said branches, and means for supplying a lubricant to said recesses through said connecting means.

27. A lubricating clip for vehicle springs comprising a pair of branches adapted to extend along opposite sides of a spring, each of said branches being provided with a recess for the reception of a lubricant, means connecting the free ends of said branches, and a distributer for lubricant associated with the connecting means and adapted to supply lubricant to both of said recesses.

28. A lubricating clip for vehicle springs comprising a pair of branches adapted to extend along opposite sides of a spring, one of said branches being provided with a lubricant receiving recess, a member connecting the free ends of said branches, a lubricant container connected with said member, and a distributing device extending from said container to said recess.

29. A lubricating clip for vehicle springs comprising a pair of branches adapted to extend along opposite sides of a spring, each branch having a recess for lubricant, a member connecting the free ends of said branches, a lubricant container carried by said member, and a distributer extending from said container in operative relation to said recess.

30. A lubricating clip for vehicle springs comprising a pair of branches adapted to extend along opposite sides of a spring, one of said branches being provided with a recess for the reception of a lubricating pad, a member connecting said branches, and means for supplying a lubricant to the recess through said connecting member.

31. The combination with a spring comprising a plurality of superimposed leaves, of means for confining a lubricating pad against a portion of the edges of the leaves at each side of the spring, and a single means for feeding the lubricant to both sides of the spring.

32. The combination with a spring comprising a plurality of superimposed leaves, of a casing fitting over the spring and extending over the sides thereof, means within the casing fitting tightly against the edges of the leaves for confining a lubricant against them, and feeding means for directing the lubricant to the edges of the leaves.

33. The combination with a spring comprising a plurality of superimposed leaves, of a clip adapted to encompass a portion of said spring, said clip carrying a compartment adapted to hold absorbent material in contact with the edges of the leaves of said spring, a pad of absorbent material in said compartment, and another compartment communicating with the aforesaid compartment and adapted to contain oil and deliver it to said absorbent material.

34. The combination with a spring comprising a plurality of superimposed leaves, of a clip adapted to encompass a portion of said spring, said clip carrying a compartment at the side of said spring, oil-carrying material in contact with the edges of the leaves of said spring in said compartment, another compartment in said clip communicating with the aforesaid compartment and adapted to contain oil and deliver it to said oil-carrying material, and means coöperating with said clip and a leaf of said spring to prevent the longitudinal displacement of said clip on said spring.

In testimony whereof I affix my signature in the presence of two witnesses.

WILLIAM H. BROWN.

Witnesses:
J. H. JEWETT,
H. J. KOEHLER.